Sept. 23, 1958 A. BENZ 2,852,872
WHEELED SHOVEL
Filed June 14, 1954
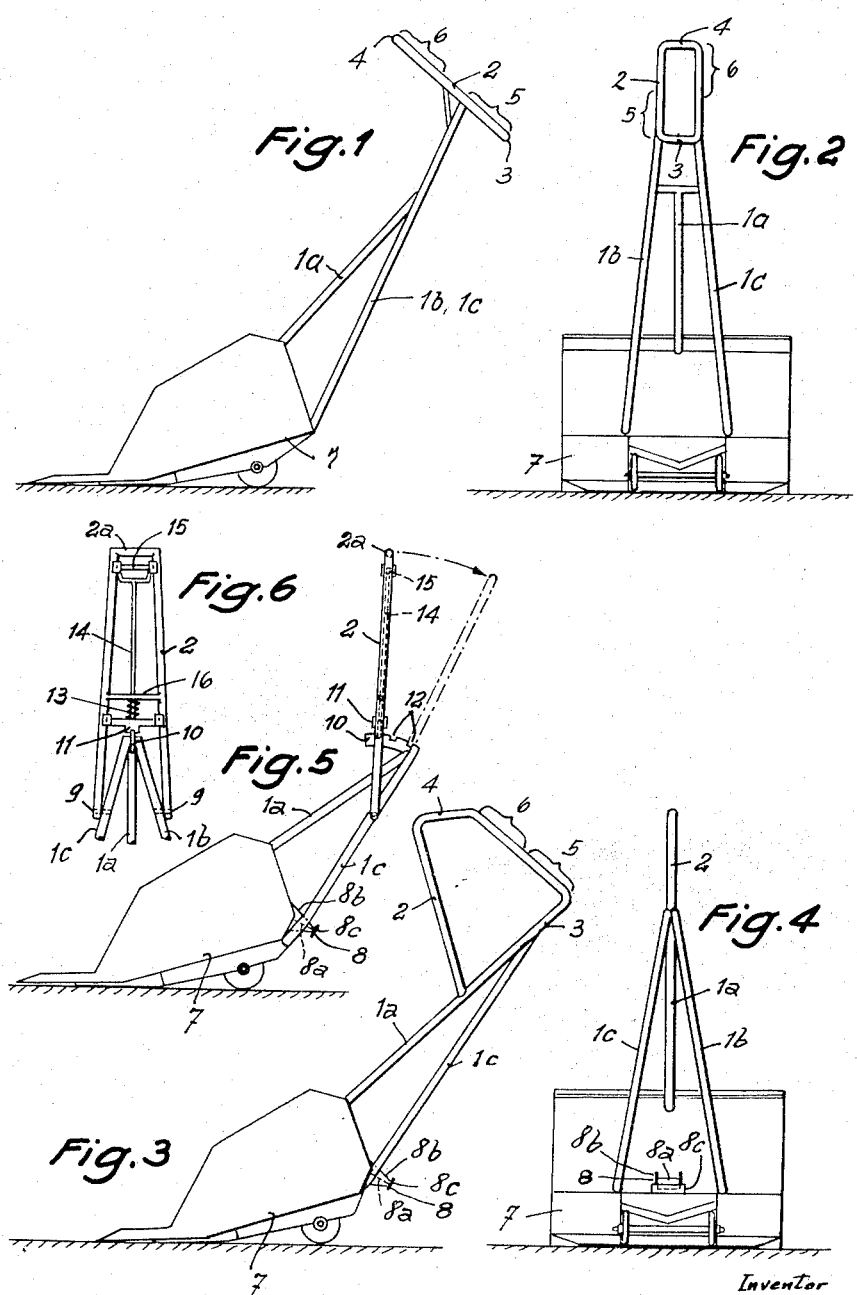
Inventor
AUGUST BENZ United States Patent Office 2,852,872
Patented Sept. 23, 1958

2,852,872

WHEELED SHOVEL

August Benz, Schlieren-Zurich, Switzerland

Application June 14, 1954, Serial No. 436,655

Claims priority, application Switzerland June 13, 1953

1 Claim. (Cl. 37—130)

Wheeled shovels are known in which the shovel, provided with an operating handle, is designed as a container open at the front and fitted with wheels, which enables the container, even when of greater capacity in comparison with ordinary shovels, to be pushed against comparatively little resistance into the bulk material and then moved away like a vehicle.

The present invention relates to an improvement in shovels of the type in that the shovel handle has at one end a gripping piece so arranged that it is possible to take hold of the grip at different heights. The embodiment in accordance with the invention makes it possible for the shovel to be manipulated with the shovel handle at various inclinations and with the workman's body in the most favorable position and for the shovel handle to be swung vertically through a large angular range, without having to bend or stretch.

The accompanying drawing illustrates by way of example three preferred embodiments of the invention, wherein:

Fig. 1 is a side view of a first embodiment of the wheeled shovel;

Fig. 2 is a rear view of the same;

Fig. 3 shows a side view of a second form of the wheeled shovel;

Fig. 4 is a rear view of the same;

Fig. 5 shows a side view of a third form of the wheeled shovel, and

Fig. 6 is the shovel handle therefor, seen from the back.

Referring to the first embodiment, the container-like shovel blade, provided with a back wall and two side walls, is fitted with a shovel handle consisting of three tubular members 1a, 1b and 1c connected to each other. The members 1b and 1c carry at their free ends a gripping piece 2 designed substantially as a rectangular frame and fixed at right angles to the tubular member 1a. Depending on the inclination which the shovel blade has to assume with respect to the ground, the gripping piece may be grasped further down or further up. When pushing the container into the bulk material, the appliance will be preferably held by the horizontal grip 3, or low down on the vertical grip parts 5. When swinging the shoveling appliance from the loading into the travelling position, a change of the gripping places will be made from 3 to 4 or from 5 to 6.

The rectangular gripping frame may be grasped at any location therealong and in filling the shovel preferably the lower grip 3 is held. Subsequently, the shovel and handle together with the frame are pivoted in vertical direction about the wheel axis to raise the shovel from the ground and to tilt the shovel so that the material contained thereon will not slide off the open end. When in this position the shovel can be withdrawn readily by pulling upon the upper grip 4.

To facilitate operation and use of the shovel, the frame lies in a plane which is substantially tangential to the cylindrical surface defined by lower grip 3 upon pivoting about the wheel axis, i. e., an imaginary line extending from the center of the wheel axis to the center of the lower grip 3 is substantially perpendicular to the plane of the rectangular frame.

In the second form, the shovel handle is provided with a stirrup-shaped gripping piece 2 which stands substantially in a vertical plane. The tubular members 1b and 1c of the handle are connected at their outer ends to the member 1a. The portion of the member 1a projecting beyond the ends of the members 1b and 1c is bent to form the stirrup-shaped gripping piece 2. Also this gripping piece is bent in such a way that it presents four different places 3 to 6 where it may be grasped. Arranged at the edge of the shovel blade 7 formed between the bottom and the rear wall of the shovel is a prop 8 located in the middle of the shovel—seen in the direction of width. Said prop includes a bar 8a with two side parts 8b and base plate 8c. When the prop 8 is set on the ground, the bulk material shoveled up with the fore-part of the shovel blade will be thrown further back thereon, so that none of the bulk material gets lost when the shovel is wheeled away.

In the third form of the wheeled shovel, the gripping piece 2 of the shovel handle is so provided that it may be swiveled and held fixed in the desired swiveled position. The gripping piece 2 includes an arm which is articulated on the tubular members 1b and 1c of the shovel handle by means of pivot pins 9. The gripping piece 2 is kept in the desired swiveled position by a quadrant 10 attached to the end of the shovel handle and provided with notches 12, and by a pawl 11 guided on the gripping piece 2 and adapted to engage one of said notches 12, the pawl being retained in the engaged position by a spring 13. The pawl 11 is connected by a rod 14 to a gripping post 15 arranged towards the end of the gripping piece 2. The spring 13 acting upon the pawl 11 is placed on the rod 14 and rests against a web 16 interconnecting the sides of the gripping piece. The cross-piece 2a at the end of the gripping piece 2 serves for grasping the shovel handle. With the fingers of the hand holding the part 2a, the post 15 can be drawn up, this disengaging the pawl 11 against the action of the spring 13.

When manipulating the wheeled shovel as shown in Figs. 5 and 6, the gripping piece 2 is brought into the most suitable position for the momentary working operation. For pushing the shovel into the bulk material, for instance, the gripping piece 2 is brought into the position as indicated in chain-dotted lines in Fig. 5. Afterwards the gripping piece is set steeper and the shovel handle is quickly swiveled downwards, thus throwing the shoveled bulk material into the backward shovel space, whereupon the bulk material may be conveniently conveyed in the shovel.

Having thus described the invention, what is claimed as new and desired to be secured by Letters Patent, is:

In a wheeled shovel having a shovel portion capable of pivotal movement in a vertical direction through a large angle about the wheel axis; first and second handle members each having a first end operaitvely connected with said shovel portion and each having a second end, a third handle member having a first end operatively connected with said shovel portion and having a second end operatively connected with said first and second handle members intermediate the ends of the latter, respectively, a substantially rectangular gripping frame lying substantially in a common plane and including upper and lower horizontally extending grips and a pair of spaced side grips extending between said upper and and lower grips, said side grips being connected with said second ends of said first and second handle members, respectively, said plane of said frame being substantially tangential to the surface defined by said lower grip in pivoting of said shovel portion about said wheel axis.

References Cited in the file of this patent
UNITED STATES PATENTS

| | | |
|---|---|---|
| 840,393 | Stewart | Jan. 1, 1907 |
| 1,298,126 | Vessey | Mar. 25, 1919 |
| 1,825,196 | McDaniel | Sept. 29, 1931 |
| 1,955,997 | Yant | Apr. 24, 1934 |
| 2,460,560 | Williams | Feb. 1, 1949 |
| 2,475,195 | Oetkin | July 5, 1949 |

FOREIGN PATENTS

| | | |
|---|---|---|
| 80,363 | Germany | Mar. 19, 1895 |